United States Patent [19]

Dodson

[11] Patent Number: 5,075,981

[45] Date of Patent: Dec. 31, 1991

[54] TREATING MATTER

[75] Inventor: Christopher E. Dodson, Reading, England

[73] Assignee: Mortimer Technology Holdings Limited, Berkshire, England

[21] Appl. No.: 197,271

[22] Filed: May 23, 1988

[30] Foreign Application Priority Data

May 28, 1987 [GB] United Kingdom ............... 8712565

[51] Int. Cl.[5] ........................................... F26B 17/24
[52] U.S. Cl. ................................... 34/57 R; 432/58
[58] Field of Search ............ 34/10, 57 A, 57 B, 57 R; 432/58, 15; 422/139, 141, 142, 145

[56] References Cited

U.S. PATENT DOCUMENTS 4,479,920 10/1984 Dodson ........................ 34/57 A X
4,532,155 7/1985 Golant et al. .
4,547,151 10/1985 Takeda ........................ 34/57 A X

FOREIGN PATENT DOCUMENTS 68853 3/1987 European Pat. Off. .
1183355 3/1970 United Kingdom .
1455149 11/1976 United Kingdom .
2164589 3/1986 United Kingdom .

Primary Examiner—Henry A. Bennet
Attorney, Agent, or Firm—Watson, Cole, Grindle & Watson

[57] ABSTRACT

Matter to be treated is passed through at least two treating regions sequentially wherein a bed of the matter is moved in a band continuously along an annular path by passing fluid through the bed along the path. The annular paths of the regions are concentric.

3 Claims, 1 Drawing Sheet

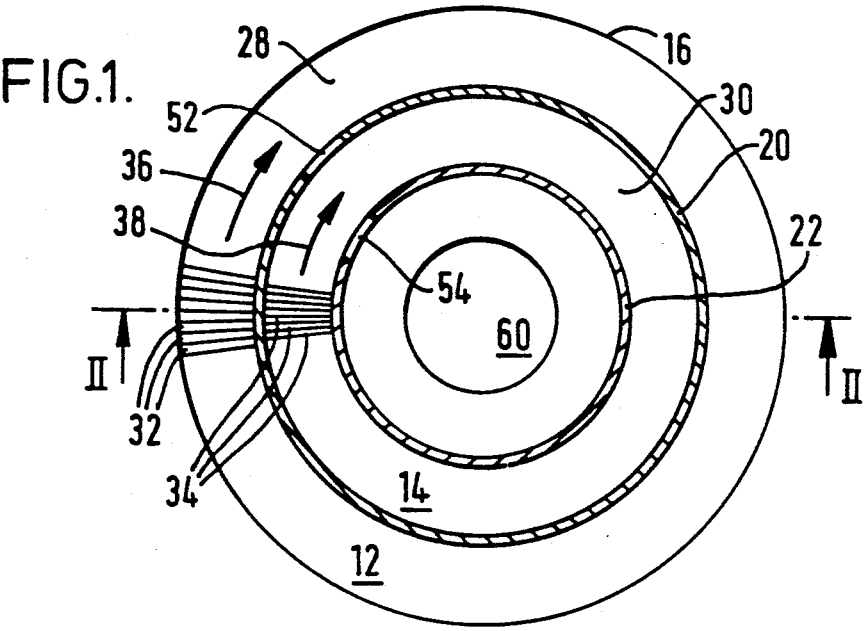
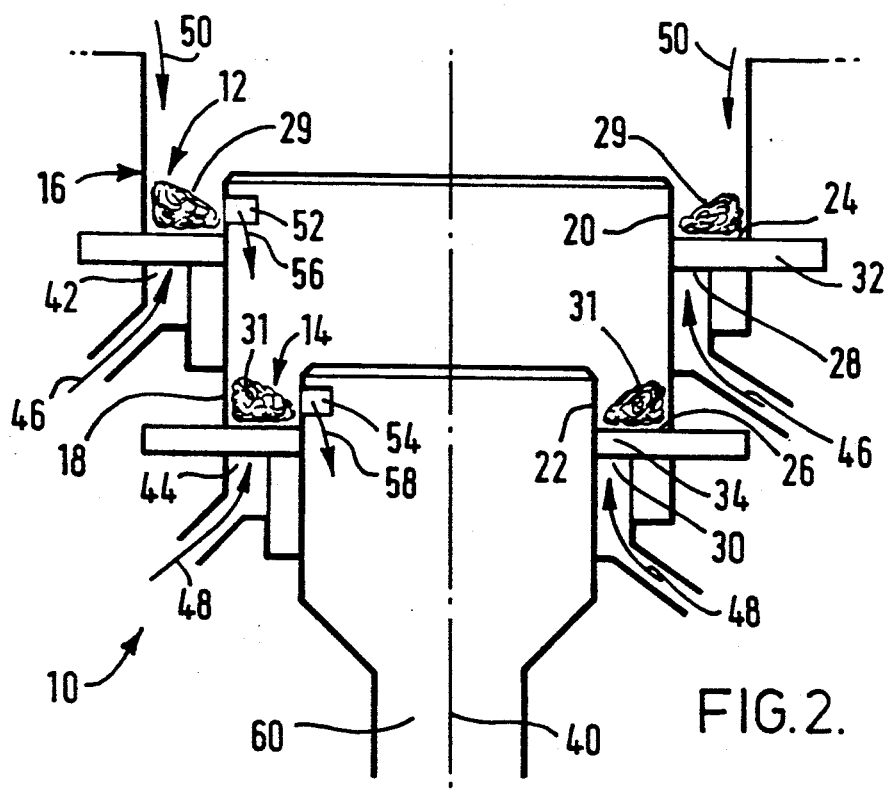

TREATING MATTER

BACKGROUND AND SUMMARY OF THE INVENTION

This invention relates to treating matter, for example particulate and/or liquid matter.

Our specification EP-B-68853 discloses apparatus for treating matter defined by a structure including a base provided with an annular fluid inlet means, means for supplying fluid to the annular inlet fluid means and means for imparting vertical and circumferential components to the flow of fluid through the inlet means for moving a bed of matter in a region in a band along an annular path in the region as the fluid passes through the bed.

I have now devised a development of the apparatus disclosed in the above-mentioned European patent specification which is advantageous in certain applications in that it increases the capacity of apparatus of a given overall size and/or provides for more efficient treatment of particular classes of matter.

The invention includes apparatus for treating matter, comprising at least two treating regions, each region being defined by a structure including a base provided with an annular fluid inlet means, the annular inlet means of the regions being disposed concentrically about an upwardly directed axis of the apparatus, means for supplying fluid to each annular fluid inlet means and means for imparting vertical and circumferential components to the flow of fluid through each inlet means for moving respective beds of matter in the regions in respective bands along respective concentric annular paths in the regions as the fluid passes through the beds.

The annular inlet means of the regions may be spaced axially and/or radially.

When the inlet means are spaced both axially and radially, preferably the axially upper of the annular inlet means is disposed radially outwardly of the other annular inlet means. Furthermore, when there are more than two of the regions, the or each of the annular inlet means which are disposed axially below the axially upper annular inlet means are disposed radially inwardly of the inlet means next above it.

When the annular inlet means of the regions are spaced axially, the apparatus preferably further comprises means for supplying matter to be treated to the region provided with the axially upper of the annular inlet means, means for enabling matter to be extracted from the region provided with the axially lower of the annular inlet means and means for transferring matter from the or each region whose annular inlet means is disposed above that of another region to the other region.

When the annular inlet means of the regions are spaced radially, the apparatus may comprise means for supplying matter to be treated to the region provided with the radially outer of the annular inlet means, means for enabling matter to be extracted from the region provided with the radially inner of the annular inlet means, and means for transferring matter from the or each region whose annular inlet means is disposed radially outwardly of that of another region to the other region. Such an arrangement enables the matter to pass sequentially through the regions.

Alternatively, when the annular inlet means of the regions are spaced radially, the apparatus may comprise means for supplying matter to be treated to the region provided with the radially outer of the annular inlet means, and means for transferring matter from the or each region whose annular inlet means is disposed radially inwardly of that of another region to the other region. Such an arrangement is preferred when the annular inlet means of the regions are spaced both axially and radially.

The invention also includes a method of treating matter in at least two treating regions, wherein in each region a bed of matter is moved in a band continuously along an annular path by passing fluid through the bed along the path, the annular paths of the regions being concentric. The concentric annular paths may be spaced axially and/or radially.

When the annular paths are spaced both radially and axially, preferably the axially upper of the annular paths is disposed radially outwardly of the other annular path or paths. Furthermore, in such a method when the matter is passed through more than two regions, the or each annular path is disposed radially inwardly of the annular path next above it.

In a method in which the annular paths are spaced axially, preferably the matter to be treated is supplied to the region having the axially upper of the annular paths and extracted from the region having the axially lower of the annular paths, the matter being transferred from the or each region having an annular path disposed above that of another region to the other region.

In a method in which the annular paths are spaced radially, the matter to be treated may be supplied to the region having the radially inner of the paths and extracted from the region having the radially outer of the paths, the matter being transferred from the or each region whose annular path is disposed radially inwardly of that of another region to the other region.

Alternatively when the annular paths are spaced radially, the matter to be treated may be supplied to the region having the radially outer of the paths and extracted from the region having the radially inner of the paths, the matter being transferred from the or each region whose annular path is disposed radially outwardly of that of another region to the other region. Such a procedure is presently preferred when the annular paths are spaced both axially and radially.

The fluid which is passed through the beds may comprise gaseous matter which treats, or reacts with, the matter in the beds.

This gaseous matter may comprise combustion gases, which heat the matter in the beds during passage through the beds.

Additionally or alternatively the fluid which is passed through the beds may comprise liquid matter which treats, mixes with, or reacts with the matter in the beds during passage through the beds. Additionally or alternatively, the fluid which is passed through the beds may comprise air.

The matter which is passed through the treating regions may comprise particulate matter and/or liquid matter.

In order that the invention may be well understood, an embodiment thereof will now be described, by way of example only, with reference to the accompanying schematic drawings.

BRIEF DESCRIPTION OF THE DRAWINGS

FIG. 1 is a top plan view of an apparatus for treating matter; and

FIG. 2 is an axial cross-section of the same apparatus taken along the line II—II in FIG. 1.

DETAILED DESCRIPTION OF THE PREFERRED EMBODIMENT

The apparatus 10 shown in the drawing comprises two treating regions 12 and 14 through which matter to be treated sequentially passes. Each region 12, 14 is bounded externally by a respective tubular wall 16, 18 and in the illustrated apparatus, both chambers 12 and 14 are annular, being bounded internally by respective tubular walls 20, 22. Each region 12, 14 has a base 24, 26 provided with an annular fluid inlet 28, 30 which is spanned by an annular array of inclined vanes 32, 34. For simplicity, only a portion of the arrays of vanes is illustrated in FIG. 1. However, it is to be understood that each array extends completely around the respective inlets 28, 30. The vanes which in the embodiment are fixed and arranged in overlapping relationship are inclined in order to impart vertical and circumferential components to the flow of fluid through the inlets 28, 30 for moving respective beds of the matter in the regions 12 and 14 in respective compact bands continuously along respective annular paths in the regions as the fluid passes through the matter in the beds. The bands are indicated at 29 and 31 respectively in FIG. 2.

The annular inlets 28 and 30, and thus the annular paths in the regions 12, 14 along which the beds of matter is moved, are disposed concentrically about an upwardly directed axis 40 of the apparatus.

In the illustrated embodiments, the annular inlets and the annular paths associated therewith are spaced both axially and radially, with the upper of the annular inlets (and the annular path associated therewith) disposed radially outwardly of the other annular inlet (and the annular path associated therewith). This arrangement is particularly advantageous in that it enables the internal tubular wall 20 of region 12 to be formed as a continuation of the external tubular wall 18 of the region 14.

The fluid which is passed through the beds of matter to move the beds continuously along the annular paths in the regions 12 and 14 is directed to the annular inlets 28 and 30 through respective supply passages 42, 44 beneath the inlets as indicated by arrows 46, 48 in FIG. 2.

The illustrated apparatus is provided with an inlet at its upper end to enable matter to be treated to be supplied to the region 12 as illustrated by arrows 50 in FIG. 2. The internal tubular walls 20 and 22 of the regions 12 and 14 are provided with respective openings 52, 54. The opening 52 enables matter to be transferred from region 12 to region 14 as indicated by arrow 56 in FIG. 2, and the opening 54 enables matter to be extracted from the region 14 as indicated by arrow 58 in FIG. 2. The matter extracted from region 14 exits the apparatus via outlet 60.

In use, matter is supplied to the region 12 to form a bed therein which is moved in band 29 continuously along an annular path by passing fluid through the bed along that path and is treated in region 12. The cross-sectional size of the band 29 of matter being moved in region 12 depends upon the amount of matter in that region. Initially, when matter is first supplied to the region 12, the band has a small cross-section and moves adjacent the external wall 16. On introduction of further matter, the cross-section of the band increases both radially inwardly and axially upwardly such that when the matter in region 12 exceeds a predetermined amount, excess matter will exit the region 12 through opening 52, be transferred to region 14 to form a bed therein which is moved in a band continuously along an annular path by the fluid which is passed through the bed along that path, and be treated in region 14. As with the band 29, the cross-sectional size of the band 31 of matter being moved in the region 14 depends on the amount of matter in that region. Likewise, initially when matter is first transferred to the region 14 from region 12, has a small cross-section and moves adjacent the external wall 18 of region 14. On transfer of further matter, the cross-section of the band 31 increases both radially inwardly and axially upwardly such that when the amount of matter in region 14 exceeds a predetermined amount, excess matter exits from region 14 through opening 54.

Thus, it will be appreciated that once the two regions 12 and 14 contain the above-mentioned predetermined amounts of matter, supply of further matter to region 12 results in matter being transferred from region 12 to region 14 and matter being extracted from region 14. In this way a throughput of matter is achieved, the matter passing sequentially through the two regions 12 and 14 before exiting the apparatus.

The above-described apparatus and method are particularly advantageous for treating matter which after being treated does not automatically rise from the bed to exit from the apparatus (as is the case for example when perlite is expanded by being heated by combustion gases which are passed through the bed as described in our specification EP-B-68853). Although there is no control in how long particular matter is retained in region 12 before being transferred to region 14 nor how long particular matter is retained in region 14 before exiting the apparatus, the fact that the matter being treated is passed through two regions enables an average treatment time to be achieved. If the treatment time is particularly critical, more control over the treatment time may be achieved by modifying the apparatus to include a further region or regions like regions 12 and 14 having annular paths concentric with the annular paths provided by regions 12 and 14. Thus, for example the illustrated apparatus could be modified to have a further region provided with an annular inlet spaced axially below and radially inwardly of inlet 30 of chamber 14. In this case, it will be appreciated that matter would be transferred from region 14 to this further region and eventually exit the apparatus from the further region.

The matter which is passed through the treating regions may comprise particulate matter and/or liquid matter. The fluid which is passed through the beds may comprise gaseous matter which treats, or reacts with the matter in the beds. For example, the gaseous matter may comprise combustion gases which heat the matter in the beds during passage through the beds. One particular example is the case where the matter being treated comprises coffee beans which are roasted as they pass through the regions by combustion gases. Another example is where the matter to be treated comprises a slurry from which the liquid is driven off by the combustion gases.

The fluid which is passed through the beds may comprise liquid matter which treats, mixes with, or reacts with the matter in the beds during passage through the beds. Again in this case, the matter in the beds may comprise particulate matter and/or liquid matter. For example, the liquid which is passed through the beds may chemically react with matter in the beds comprising solid particulate matter suspended or dissolved in liquid matter.

The fluid which is passed through the beds may alternatively comprise air in which case the purpose of the fluid may be merely to move the matter in the beds along their annular paths. For example, the matter in the beds may comprise particulate matter and liquid matter which coats the particulate matter as both the particulate matter and liquid matter are moved along the annular paths.

It will also be appreciated that a different fluid may be passed through each bed to enable different treatments to be carried out on the matter when it is in each bed.

It will be appreciated from the above that by providing a plurality of treating regions through which the matter to be treated passes sequentially and in which the matter is moved along respective concentric annular paths, the path length for the matter (and thus the capacity of the apparatus) is increased for a given overall size as compared with the apparatus disclosed in our specification EP-B-68853 where only one treating region having an annular path is present.

Whilst the embodiment discloses one particular arrangement of concentric paths in which two annular paths are spaced both axially and radially with the axially upper of the annular paths disposed radially outwardly of a lower annular path, it is to be understood that more than two annular paths may be provided and that these paths may be spaced only radially or only axially. Furthermore, whilst in the embodiment the matter to be treated is supplied to the region having the radially outer path and extracted from the region having the radially inner path, it is envisaged that matter may be supplied to a region having the radially inner path and extracted from a region having the radially outer path.

Whilst in the above-described apparatus and method, the matter is passed sequentially through the concentric regions, it is to be understood that this is not essential and instead matter can be supplied directly to respective concentric regions and treated only in one such region. Such an embodiment of the invention can be advantageously utilised when the matter being treated in the beds does automatically rise from the beds after treatment to exit the apparatus, as is the case for example when perlite is expanded as aforementioned. It will be appreciated that in such an embodiment the utilisation of concentric treating regions rather than just one annular treating region as disclosed in EP-B-68853 increases the capacity of the apparatus for a given diameter.

I claim:

1. Apparatus for treating matter, comprising at least two treating regions, each region being defined by a structure including a base provided with an annular fluid inlet means, said annular inlet means of the regions being disposed concentrically about an upwardly directed axis of the apparatus; said annular inlet means of said regions being spaced axially and radially, the axially upper of said annular inlet means being disposed radially outwardly of the other annular inlet means; means for supplying matter to be treated to the region provided with the axially upper and radially outer of the annular inlet means; means for enabling matter to be extracted from the region provided with the axially lower of the annular inlet means; means for transferring matter from a said region whose annular inlet means is disposed above and radially outwardly of that of another region to said other region; means for supplying fluid to each annular fluid inlet means; and means for imparting vertical and circumferential components to the flow of fluid through each inlet means for moving respective beds of said matter in said regions in respective bands along respective axially and radially spaced concentric annular paths in said regions as said fluid passes through said beds.

2. Apparatus as claimed in 1, comprising more than two said regions, wherein the annular fluid inlet means of each region other than the region provided with the axially upper inlet means is disposed radially inwardly of the annular inlet means next above it.

3. Apparatus for treating matter, comprising at least two treating regions, each region being defined by a structure including a base provided with an annular fluid inlet means, the annular inlet means of the regions being spaced radially and disposed concentrically about an upwardly directed axis of the apparatus, means for supplying matter to be treated to the region provided with the radially outer of the annular inlet means, means for enabling matter to be extracted from the region provided with the radially inner of the annular inlet means, means for transferring matter from a said region whose annular inlet means is disposed radially outwardly of that of another region to said other region, means for supplying fluid to each annular fluid inlet means, and means for imparting vertical and circumferential components to the flow of fluid through each inlet means for moving respective bands along respective radially spaced concentric annular paths in said regions as said fluid passes through said beds.

* * * * *